Nov. 8, 1966     J. L. DE BOO     3,283,974
CHADLESS PERFORATOR
Filed Sept. 10, 1965
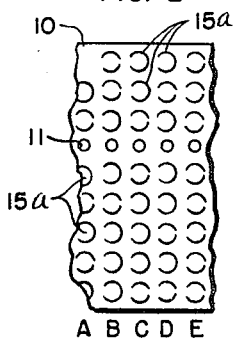
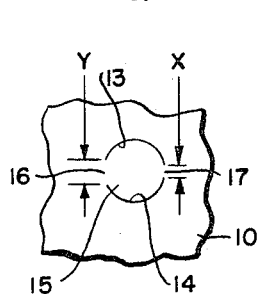
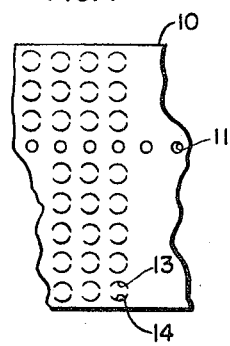
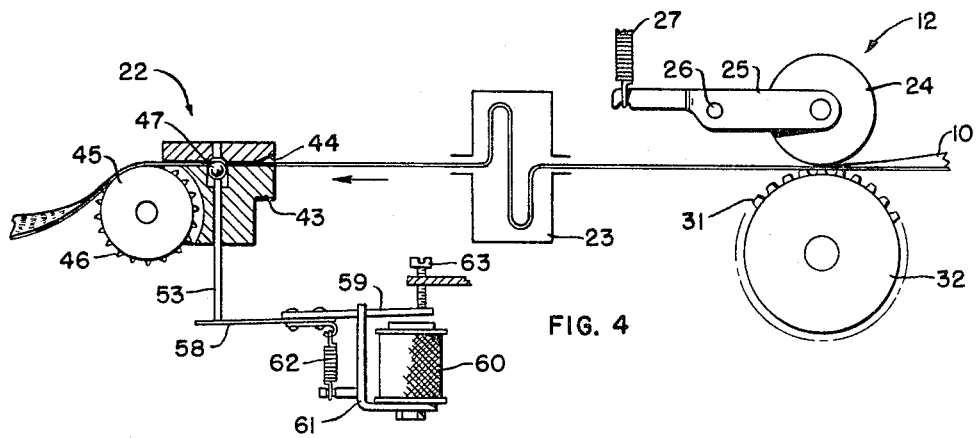
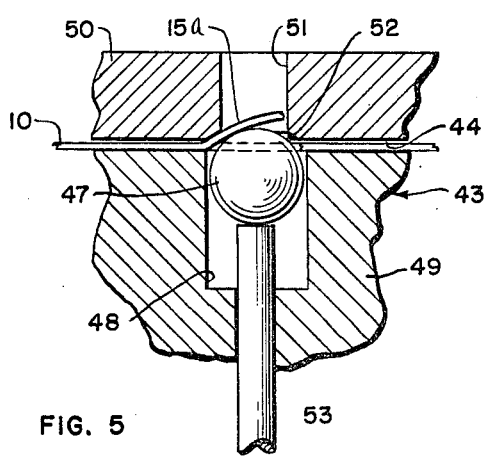
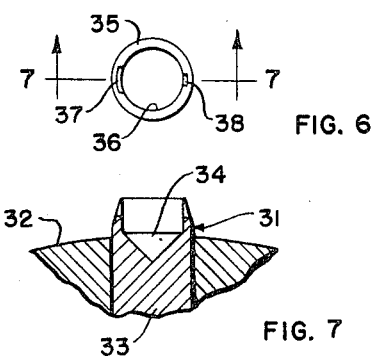
INVENTOR
JEROME L. DEBOO
BY R. C. Terry
ATTORNEY

United States Patent Office 3,283,974
Patented Nov. 8, 1966

3,283,974
CHADLESS PERFORATOR
Jerome L. De Boo, Barrington, Ill., assignor to Teletype Corporation, Skokie, Ill., a corporation of Delaware
Filed Sept. 10, 1965, Ser. No. 486,501
8 Claims. (Cl. 225—2)

This invention relates to a method of and an apparatus for perforating telegraph tape and more particularly to a method of and apparatus for perforating chadless telegraph tape.

In the field of telegraph transmission chadless tape has been used for controlling the transmission of messages in order to eliminate the problems inherent in handling the chad or confetti-like scrap material produced in fully perforating the tape. Such chadless tape is described in detail in Patent No. 2,255,794, issued September 16, 1941 to R. A. Lake. The perforating mechanisms for perforating such tape or for perforating fully perforated tape are quite complex and with the increase in speed of telegraphic transmission, the prior known perforators have been hampered because of the time required to first select and then actuate perforating pins to produce such intelligence bearing tape. In tape of the type used for controlling telegraphic transmission, the spacing of the rows of the holes in the tape is quite critical. As a matter of fact, the recently proposed international standard for the spacing of code holes in telegraph tape places rather stringent restrictions on the distance allowable between successive rows of holes and on the number of holes per given length of tape. Under this standard, while the spacing between adjacent rows of holes may vary by as much as plus or minus .003" with the rows formed ten to the inch, no more than a total of plus or minus .010" is allowed for each ten holes and no more nor less than .025" in any five inches or fifty rows of holes.

It is an object of the present invention to produce intelligence bearing webs, having chadless holes, at the highest possible speed while maintaining the overall spacing of rows of holes within the closest possible limits.

Another object of the invention is to provide a simple method for producing intelligence bearing tapes at high speeds.

A further object of the invention is to provide an apparatus for perforating chadless holes in telegraph tape at high speeds while maintaining the overall spacing of the holes within close limits.

In accordance with one embodiment of the invention the tape is fed through a cutting or perforating mechanism which forms arcuate slots through the tape on opposite sides of each possible code hole location in the tape to provide a tape lid at each possible code hole location which is fixed to the tape at its forward and trailing edge and then feeding the tape with these perforations or slots formed in it past a signal responsive device which will press a ball against the lid to burst the imperforate section of the tape at the trailing edge of holes at selected positions and thereby produce a tape having information encoded in its as represented by those code holes that have been completely formed by the bursting operation.

Such a tape may be fed through a tape sensing device and the sensing pins of the device will be blocked from moving by those lids whose trailing edge have not been burst from the web of tape and those sensing pins that engage lids whose trailing edges have been burst or severed will be permitted to pass partly through the tape to read the information coded in the tape.

A more complete understanding of the invention may be had by reference to the accompanying drawing wherein:

FIG. 1 is a view of a short section of tape which has been perforated to form slots in the tape on opposite sides of each code hole location;

FIG. 2 is a view of a tape in which some of the chadless holes have been formed by bursting the tape at the trailing edge of selected ones of the code holes;

FIG. 3 is an enlarged fragmentary view of one of the code hole locations in the tape showing the configuration of the slots formed at the code hole location, the imperforate portion of the tape which may ultimately be burst to form a code hole in the tape and the portion which forms the hinge for the chad lid;

FIG. 4 is a sectional view through a tape preparing device for forming coding chadless tape in response to received telegraphic signals;

FIG. 5 is an enlarged fragmentary sectional view showing the manner in which the lid is burst free from the remainder of the body of the tape;

FIG. 6 is a top view of a perforating or shearing knife used to cut the slots in the tape at each code hole location; and FIG. 7 is a sectional view taken along the line 7—7 of FIG. 6 in the direction of the arrows showing details of one of the perforating or shearing knives which cut slots in the tape.

The method and apparatus comprising the preferred form of the invention are illustrated in the drawing wherein like reference numerals designate the same parts throughout the several views. In the practice of the method a tape 10 is provided with tape feed holes 11, spaced .10" apart, and contain any desired number of levels of code hole locations. As illustrated the tape 10 has eight possible code hole locations or levels in each row. The tape 10 may have the feed holes 11 perforated in it prior to feeding it through a tape preparing perforator 12 or the tape preparing perforator 12 may be equipped with punches for punching these feed holes at exact intervals along the length of the tape in any suitable manner. The feed holes 11 are spaced exactly 1/10" apart and, in accordance with the present invention, arcuate slots 13 and 14 are formed at each feed hole location, in each row across the tape, by the tape preparing perforator. These slots 13 and 14 are arranged to define substantially the entire periphery of a chad lid 15 and when the slots 13 and 14 are formed the chad lid 15 will remain attached to the main body of the tape or web 10 by a hinge portion 16 and by a tab portion 17. The diameter of the hole or perforation preferably is .072" whereas the hinge portion as indicated at X is approximately .040" and the tab portion is approximately .015".

Tape 10 prepared in the manner just described may be fed to an encoding mechanism 22 operated under control of incoming intelligence signals for selectively bursting the tab portions 17 to encode data on the tape by severing the chad lid 15 from the main body of the tape or web 10 at all points except the hinge portion 16 whereby the tape 10 may be read by any suitable tape reader capable of reading such chadless tape. As shown in FIG. 2 the chad lids 15 have not had their tab portions 17 broken at certain levels of each row of hole locations in the tape 10 but have had the tabs 17 severed or burst at those chad lids designated 15a. For example, in row A of FIG. 2, counting from the top down, the first, second, fourth, sixth and eighth chad lids 15a have had their tabs 17 burst or severed. In row B the third, fourth, sixth, seventh and eighth hole locations are encoded by breaking the tabs 17 at those locations. In this manner, the tape is first prepared for encoding and then encoded by bursting selected tabs 17 to release the chad lids 15a for rocking movement about their hinges 16 in a tape reader.

The mechanism provided for effecting the method just described comprises generally the tape preparing perforator 12, a storage area 23, and the encoding mechanism 22. While any type of perforator may be utilized to prepare a tape as illustrated in FIG. 1 it is preferred to use a pressure roller 24 mounted upon a lever 25 that is pivoted on a pivot shaft 26 and urged to rock clockwise (FIG. 4) by a contractile spring 27. This pressure roller 24 is urged by the spring 27 to press the tape 10 down against a series of cutting tools 31 carried about the periphery of roller 32. These cutting tools 31, as illustrated most clearly in FIGS. 6 and 7, each comprise a cylindrical body 33 having a central bore 34. The body 33 terminates, at its end which protrudes from the roller 32, in a pair of knife edges 35 and 36 that are arcuately shaped and substantially coextensive with the periphery of a desired code hole in the tape. At its left edge, as shown in FIGS. 6 and 7, each of the cutting tools 31 is relieved or cut away as indicated at 37 and at its right edge is cut away as indicated at 38. Thus, when the roller 24 presses the tape against the tools 31, the two arcuate slots 13 and 14 will be formed in the tape at each code hole location by the cutting edges 35 and 36, respectively, and the cut away portions 37 and 38 will leave the hinge portion 16 and tab portion 17 of the tape lid 15 attached to the main body of the web or tape 10.

It will be understood that the roller 32 supports a plurality of rows of cutting tools 31 extending around its periphery and axially aligned with respect to the roller 32. In the embodiment of the invention illustrated herein, there are provided eight rows of tools 31 for forming slots 13 and 14 on opposite sides of each of the eight possible code hole locations in a given row of the tape 10. If the tape or web 10 is prepunched with the feed holes 11, the roller 32 is provided with feed sprocket pins (not shown) and an annular groove is formed in the pressure roller 24 to accommodate the sprocket feed pins. As the roller 32 is rotated by any suitable mechanism (not shown) the tape 10 will be fed to the left (FIG. 4) and will have arcuate slots 13 and 14 formed in it at each possible code hole location. The tape preparing perforator 12 guides the tape to any suitable storage device or area 23 as it cuts the arcuate slots 13 and 14 in the tape.

The encoding mechanism 22 comprises a perforator block 43 in which there is formed a guide passage 44 through which the tape 10 may be drawn by a feed wheel 45 having sprocket pins 46 formed about its periphery.

It will be understood that any of the eight chad lids 15 in each row of possible code hole locations across the tape may be selectively separated from the web by breaking the tab portions 17. Thus, while only a single bursting or severing device is shown in detail in FIG. 4, it will be understood that there are eight of these devices extending across the perforator block 43. Only a single bursting device will be described in detail. The perforator block 43 is provided with eight pockets or bores 48 extending across it and in each of these pockets there is retained a ball member 47. The perforator block 43 comprises a lower portion 49 to which a top plate 50 is suitably attached to define the guide passage 44. Aligned with each pocket or bore 48 in the lower portion 49 of the perforator block 43 is an aperture 51 in the top plate 50. The lower end of the aperture 51 is beveled as shown at 52 and the aperture 51 is appreciably smaller than the ball member 47 so that the ball member 47 may be moved only partially into the aperture 51 by a slidable member 53 and will be prevented from escaping completely from the pocket or bore 48.

As shown in FIG. 4 the ball member 47 is pressed against the under side of a chad lid 15 which has not been freed from the tape 10 since its tab portion 17 has not been burst. The ball member 47 is urged up into engagement with the under side of the tape 10 by a clock spring armature extension 58 which exerts sufficient pressure on the slidable member 53 to hold the ball member 47 against the tape but does not exert sufficient pressure to burst the tab portion 17 when no code hole is called for in the tape at the code hole location. The clock spring armature extension 58 is fixed to the end of an armature 59 of an electromagnet 60. The armature 59 is urged to rotate in a counterclockwise direction (FIG. 4) about an armature support 61 by a contractile spring 62. When the armature 60 is deenergized the right end of the armature 59 will bear against an adjustable abutment 63 and when the armature 59 is in this position the clock spring armature extension 58 will urge the ball member 47 associated with it upwardly against the bottom of the tape but will not cause the ball member to sever or burst a tab portion 17. When the electromagnet 60 is energized, additional force will be provided through the armature extension 58 and slidable member 63 to force the ball member upwardly with sufficient force to burst the tab portion 17 of a chad lid 15a and that selected chad lid will then be attached to the tape or web 10 only by its hinge portion 16. It will be understood that there are eight electromagnets 60 and their cooperating parts, that is, one for each possible code hole location across the width of a tape 10.

When an electromagnet 60 is energized it will rock its armature 69 clockwise and through the armature extension 58 force the slidable member 53 upwardly to press the ball member 47 against a chal lid 15 to break or burst the chad lid 15a away from the body of the tape 10. While the feed wheel 45 may be driven intermittently, and —preferably is so driven, it could be driven continuously and the time of operation of the electromagnets 60 could be regulated to cause the electromagnets to be energized at approximately the time that a chad lid 15 would be in position above the ball member 47. It should be apparent that this timing is not highly critical since the pressure of the ball member 47 may be applied to the chad lid 16 along most of its area and the lid 15 will only be separated along the web 10 at the weak point or tab portion 17. This permits the formation of code holes in the tape 10 that are located with a great degree of exactness at high speeds.

Although a particular embodiment of the invention is shown in the drawings and described in the foregoing specification it will be understood that the invention is not limited to that specific embodiment, but is capable of modification and rearrangement, and substitution of parts and elements without departing from the scope of the invention.

What is claimed is:

1. The method of perforating chadless telegraph tape comprising:
   perforating arcuate slots in a tape on opposite sides of each possible code hole location in the tape;
   moving said tape past a hole bursting station; and
   applying bursting pressure to the tape at selected code hole locations to break one of the imperforate sections between said arcuate slots while said tape is moving through the bursting station.

2. A method of perforating chadless telegraph tape comprising:
   perforating arcuate slots in a tape on opposite sides of each possible code hole location in the tape while leaving a relatively large imperforate area at the leading edge of each of said possible code hole locations and a relatively small narrow imperforate area at the trailing edge of said locations;
   advancing said tape in a predetermined direction past a hole bursting station; and
   applying bursting pressure to the tape at selective code hole locations to break the trailing one of the imperforate areas between said arcuate slots while said tape is moving through the bursting station.

3. A machine for perforating chadless intelligence-representing code holes in rows across a web of material comprising:
   means for precutting a pair of opposed slots in the web at each possible code hole location to leave a portion of the web material imperforate at each such location on the opposite sides of the hole to form a hinge and a severable portion; and signal controlled means for parting said severable portion from the web in those hole locations where a hole is desired.

4. In a signal controlled perforator for perforating code combinations of chadless holes in telegraph tape comprising:

means for precutting all of the desired periphery of the hole in each possible hole location of the tape except for a tab portion of the tape material on the side of the hole opposite the chad hinge thereby to partially form chad lids;

signal controlled means selectively operated to apply pressure to the chad lids to sever said portions at those hole locations where a hole is desired; and means for advancing the tape from the precutting means through the signal controlled means.

5. In a signal controlled perforator for producing intelligence bearing webs having the intelligence encoded thereon in the form of code combinations of holes;

means for cutting through the web at each possible code hole location to effect a substantially complete severance of a section of said web at each such location while leaving at least one tab connecting each of said sections to the body of the web;

a signal controlled plunger means for selective engagement with said sections of the web to burst said tabs at selected locations; and means for advancing said web from said cutting means through said plunger means.

6. Apparatus for producing chadless perforations in an intelligence bearing web comprising:

means for partially cutting holes at predetermined areas of the web to leave a chad lid attached to the web at more than one point on the periphery of the lid; and selectively operable means for applying pressure to the lids to break selected chad lids from the web leaving each lid attached to the web at only one point thereby to encode data on the web.

7. Apparatus according to claim 6 wherein said cutting means comprises at least one cutting tool having a plurality of arcuately shaped cutting edges for substantially completely shearing a hole at each possible code hole location of the web.

8. Apparatus for producing chadless perforations in an intelligence bearing web comprising:

means for partially cutting holes at each possible code hole location on the web to leave a chad lid attached to the web at more than one point on the periphery of each lid; and selectively operable means for applying pressure to the lids to break selected chad lids from the web leaving the lid attached to the web at only one point thereby to encode data on the web;

said selectively operable means including, an electromagnet selectively energizable in response to incoming signals, an armature having a flexible lever attached to it for actuation by said electromagnet, a perforator block, a web guiding passage in said block, a spherical member movably mounted in said block for movement in a direction normal to the direction of web movement through the guiding passage, and a slidable member normally urged by said flexible member to press said spherical member against the web with insufficient pressure to break the lid from the web and operated upon energization of said electromagnet to apply sufficient additional pressure to said spherical member to break the selected chad lid from the web.

References Cited by the Examiner

UNITED STATES PATENTS

| | | | |
|---|---|---|---|
| 2,255,794 | 9/1941 | Lake | 234—129 X |
| 2,647,580 | 8/1953 | Connolly | 234—28 |
| 2,989,228 | 6/1961 | Glattli | 234—50 |
| 3,013,716 | 12/1961 | Sim | 234—129 |
| 3,096,015 | 7/1963 | Bradbury | 234—107 |

WILLIAM W. DYER, JR., *Primary Examiner.*

JAMES M. MEISTER, *Examiner.*